US008627100B2

(12) United States Patent
Hu et al.

(10) Patent No.: US 8,627,100 B2
(45) Date of Patent: Jan. 7, 2014

(54) SEPARATE TYPE MASS DATA ENCRYPTION/DECRYPTION APPARATUS AND IMPLEMENTING METHOD THEREFOR

(75) Inventors: Peng Hu, Beijing (CN); Yong Li, Beijing (CN)

(73) Assignee: Beijing Watch Data System Co., Ltd., Beijing (CN)

( * ) Notice: Subject to any disclaimer, the term of this patent is extended or adjusted under 35 U.S.C. 154(b) by 1584 days.

(21) Appl. No.: 11/885,513

(22) PCT Filed: Jun. 7, 2006

(86) PCT No.: PCT/CN2006/001236
§ 371 (c)(1),
(2), (4) Date: Aug. 31, 2007

(87) PCT Pub. No.: WO2006/131069
PCT Pub. Date: Dec. 14, 2006

(65) Prior Publication Data
US 2008/0141022 A1 Jun. 12, 2008

(51) Int. Cl.
*G06F 12/14* (2006.01)
(52) U.S. Cl.
USPC .......................................... 713/189; 713/190
(58) Field of Classification Search
None
See application file for complete search history.

(56) References Cited

U.S. PATENT DOCUMENTS

| 6,003,135 | A | | 12/1999 | Bialick et al. ................. 713/201 |
|---|---|---|---|---|
| 6,005,613 | A | * | 12/1999 | Endsley et al. ............. 348/231.6 |
| 6,256,701 | B1 | * | 7/2001 | Goto ............................. 710/261 |
| 6,262,915 | B1 | | 7/2001 | Kihara et al. ............ 365/185.11 |
| 6,439,464 | B1 | * | 8/2002 | Fruhauf et al. ................. 235/492 |
| 6,783,078 | B1 | * | 8/2004 | Leaming ........................ 235/492 |
| 7,386,717 | B2 | * | 6/2008 | Adusumilli .................... 713/153 |
| 2001/0025882 | A1 | * | 10/2001 | Coulier ........................ 235/380 |
| 2002/0023209 | A1 | | 2/2002 | Domstedt et al. ............. 713/160 |
| 2002/0090090 | A1 | * | 7/2002 | Van Rijnsoever et al. .... 380/279 |
| 2002/0103944 | A1 | * | 8/2002 | Feuser et al. .................... 710/2 |
| 2003/0093812 | A1 | * | 5/2003 | Chang et al. .................. 725/133 |
| 2004/0030896 | A1 | * | 2/2004 | Sakamura et al. ............ 713/169 |
| 2004/0073726 | A1 | * | 4/2004 | Margalit et al. ................. 710/72 |
| 2004/0256470 | A1 | * | 12/2004 | Takami et al. ................ 235/492 |
| 2005/0149640 | A1 | * | 7/2005 | Hosokawa ........................ 710/8 |

(Continued)

FOREIGN PATENT DOCUMENTS

| CN | 1302404 | 7/2001 |
|---|---|---|
| CN | 1464676 | 12/2003 |
| CN | 1464676 A | 12/2003 |
| EP | 1241553 | 9/2002 |

OTHER PUBLICATIONS

ST22T064-A "Smartacard 32-Bit RISC MCU with 64 Kbytes EEPROm & USB 2.0 Full Speed Device Controller", Oct. 2004.*

(Continued)

*Primary Examiner* — Peter Poltorak
(74) *Attorney, Agent, or Firm* — Fay Kaplun & Marcin, LLP

(57) ABSTRACT

Embodiments of the present invention relate to a separate type mass data encryption/decryption apparatus and an implementing method therefor. The separate type mass data encryption/decryption apparatus includes a microprocessor and a storage unit for storing an encryption/decryption key. The apparatus further includes an external communication interface module connecting to a peripheral data bus for transmitting data between the encryption/decryption apparatus and an external terminal, and said microprocessor is used for encrypting/decrypting data inputted from the external terminal. Embodiments of the present invention can process mass data with higher security and expedience.

13 Claims, 6 Drawing Sheets

(56) References Cited

U.S. PATENT DOCUMENTS

2005/0211788 A1* 9/2005 Drabczuk et al. ............. 235/492
2005/0240689 A1* 10/2005 Leaming ........................ 710/52

OTHER PUBLICATIONS

Haney (Haney et al., "Unversla Serial Bus (USB)" Jun. 2001, retrievied from http://tomeboy28.50megs.com/USB.html).*

* cited by examiner

SEPARATE TYPE MASS DATA ENCRYPTION/DECRYPTION APPARATUS AND IMPLEMENTING METHOD THEREFOR

TECHNICAL FIELD

The present disclosure generally relates to the field of communication and information security. In particular but not exclusively, the present disclosure relates to a separate type mass data encryption/decryption apparatus and an implementing method therefor.

DESCRIPTION OF THE RELATED ART

With the rapid development of computer and internet technologies, many government offices, enterprises, other organizations and individuals have built their computer network systems, trying to use the internet to establish a fast and efficient network channel between the public and themselves. Thus, e-commerce and e-government affairs have become one of the main ways for them to provide various services and obtain information. Due to the particular industrial characteristics of the information service system based on the internet, the security of data transmission in a network becomes more and more important, for example, in network bank business, network tax reporting and network enterprise annual inspecting. In these systems, there is a large amount of information which is required to be kept secret. Such information must be protected in an encrypted manner in the network transmission to ensure the sensitive data therein to be transferred in security. At the same time, besides the data transmission in the network application, data in a user terminal (such as data in a hard disc) is also required to be encrypted to protect the access. When an attacker detaches a hard disc from a user terminal and installs it into another user terminal, it will be difficult for the attacker to know and decrypt information in the hard disc because a large amount of system data in the hard disc is stored in an encrypted manner, by which the security of the data is ensured.

People have already a common understanding that encryption technology should be applied to both network information service systems and user local data, and have adopted various encryption technologies to protect them. For example, IC card technology and software module were applied to improve the reliability of the encryption technologies such as identity authentication. However, because of the restriction of some realistic conditions such as finance and technology maturity, currently a majority of systems still use a manner of software encryption to perform a simple data encryption protection.

In a software encryption, an encryption/decryption key is generated by a key generating end such as an IC card or a software module, and an encryption/decryption operation is carried out by the CPU and the inner memory of a terminal. However, because the key used in the software encryption is required to be provided by the communication layer of the system from the generating end to the terminal and be stored in the inner memory of the terminal, an attacker can easily obtain the encryption/decryption key by monitoring the communication layer of the user terminal or stealing the data in the inner memory of the terminal, and then the encrypted data is easily decrypted. At the same time, because a computation to data which needs to be encrypted/decrypted is carried out using the CPU and the inner memory of the terminal, volumes of system resources are occupied.

In order to overcome the shortcomings in the above encryption technology such as "easy to be decrypted" and "occupation of system resources", people have proposed a hardware encryption technology to perform an encryption operation to data. In the conventional hardware encryption technology, an encryption chip is installed in or an encryption card is inserted into the terminal, a microprocessor contained in the chip or card is used to generate the encryption/decryption key, and an encryption/decryption computation to data which is required to be encrypted/decrypted is performed in the chip or card. However, because an encryption chip is installed or an encryption card is inserted into the terminal in the above technology, it is inconvenient for the user to use. In addition, the encryption chip and card are very expensive because most of them are provided by overseas manufacturers. Even the homemade products generally have the prices of thousands to tens of thousands RMB Yuan, and thus these products are difficult to spread to ordinary users.

BRIEF SUMMARY

This section is for the purpose of summarizing some aspects of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

In order to overcome the shortcomings in the conventional technology, one aspect of the present invention is to provide a separate type mass data encryption/decryption apparatus and an implementing method therefor, in which mass data transferred at high-speed is encrypted/decrypted with high security and low cost.

Other aspects, features, and advantages will become apparent upon examining the following detailed description of one or more embodiments, taken in conjunction with the attached drawings.

The technical scheme of various embodiments of the present invention is as follows:

A separate type mass data encryption/decryption apparatus comprises in one embodiment a microprocessor and a storage unit for storing an encryption/decryption key, wherein the apparatus further comprises:

an external communication interface module connecting to a peripheral data bus for transferring data between the encryption/decryption apparatus and an external terminal, and said microprocessor performs an encryption/decryption operation to data inputted from the external terminal.

The encryption/decryption apparatus receives data from the external terminal in an interrupt control mode and transfers data to the external terminal in a bulk transmission mode in one embodiment.

The microprocessor of one embodiment is an at least a 32-bit multilevel pipeline RISC processor and supports a secure access control of hardware and an access control of peripheral component.

The external communication interface module of one embodiment comprises at least a Universal Serial Bus interface module and an ISO7816 interface module.

An encryption/decryption implementing method of a separate type mass data encryption/decryption apparatus comprises in one embodiment:

a first step of the encryption/decryption apparatus receiving data packets which are sent by a terminal and required to be encrypted/decrypted;

a second step of storing the data packets into a storage unit;

a third step of a microprocessor performing encryption/decryption to the data packets by calling an encryption/decryption key stored in the storage unit according to a encryption/decryption command control word contained in the data packets, and storing the encrypted/decrypted data packets in the storage unit; and a fourth step of sending the encrypted/decrypted data packets to the terminal in a bulk transmission mode.

In the first step, the terminal is a cable terminal, a wireless terminal or a handheld terminal according to various embodiments.

In the first step, a data communication protocol command applied between the encryption/decryption apparatus and the terminal comprises a card head selection command word, a communication selection command word, a stream control word, a data length word and a data field according to various embodiments.

In the second step, the data packet has 64 bytes in one embodiment.

In the third step, the encryption/decryption command control word has a 2-bytes length in one embodiment.

In the third step, the lower three bits of the encryption/decryption command control word serve as a channel mark for stream information encryption/decryption operation in one embodiment.

The third step also comprises a step of encrypting/decrypting the key in one embodiment.

In the fourth step of sending the data to the terminal in the bulk transmission mode, data is transferred by 2-6K bytes one time in an embodiment.

The encryption/decryption adopts a symmetric algorithm or an asymmetric algorithm in one embodiment.

One embodiment of the present invention has prominent advantages and positive effects. It adopts hardware as encryption carrier, uses a microprocessor carried by hardware devices to generate encryption/decryption key and performs an encryption/decryption computation to data which is required to be encrypted/decrypted in the chip to effectively improve the security of mass data during the transmission. It also provides a flexible and fast communication method which greatly facilitates the use of users. One or more embodiments of the present invention has the advantages as follows.

1. Flexibility and randomicity of generating and changing of the key. The terminal of one embodiment can perform an encryption/decryption computation by use of a key randomly generated in the encryption/decryption apparatus or by transferring the key value to the encryption/decryption apparatus. The key will be stored in an encrypted protective area and can not be read again once it is generated or written. When the key is required to be changed, the terminal can send a command to update the key by the hardware itself or send a key again to the apparatus. At the same time, an encryption method can also be used during the course of key transmission to protect the key value, so that attacks such as internal memory wiretapping and communication layer monitoring mentioned above can be prevented completely.

2. High speed and powerful data processing capacity. In one embodiment of the present invention, the encryption/decryption apparatus is connected with the terminal directly with an USB. In addition, the apparatus of the present invention can support a communication speed of the USB with a full speed of 12 Mbps, or that of the USB with a high speed of 480 Mbps. Because the microprocessor in the encryption/decryption apparatus is 32 bit or above, the apparatus of one embodiment of the present invention has a powerful data computing and processing capacity. At the same time, an asymmetric algorithm coprocessor module and a symmetric algorithm coprocessor module are embedded in the apparatus, by which data processing speed can be improved during the encryption/decryption computation. In addition, burden on occupied microprocessor resources caused by mass data computation can also be relieved so that the microprocessor can perform other data processing, by which the overall computing capacity of the apparatus is improved.

3. Convenient and flexible use. The apparatus of one embodiment is connected to the terminal by a USB interface so that functions of plug-and-play and hot-plugging can be supported. The user can perform a mass data encryption/decryption operation without the needs of installing a chip or inserting an encryption card into the terminal. At the same time, installation and detachment of hardware devices are very simple, which facilitates the user. Only with the encryption/decryption apparatus, the user can have encryption/decryption services on any terminals which are installed with a driver supporting the apparatus. If the encryption/decryption apparatus according to one embodiment of the present invention is combined with the FLASH technology to use an AUTORUN function, then the apparatus can realize a function of automatically installing the driver, which further facilitates the user.

4. High security and reliability. In one embodiment of the present invention, hardware is used as an encryption carrier, the encryption/decryption key is generated by the microprocessor carried by the hardware devices and the encryption/decryption computation to data which is required to be encrypted/decrypted is performed in the chip. Therefore, security and reliability of the mass data in transmission process are improved greatly. Because the encryption/decryption apparatus of one embodiment of the present invention can realize an asymmetric algorithm, such as a 1024-bit Public-Key encryption algorithm (RSA), a 2048-bit RSA algorithm and an error correction code algorithm (ECC), it can be combined with a PKI (public key infrastructure) technology to store a public key and a private key of the user and keep the user's certificate. In addition, computations for signing, authenticating, encrypting and decrypting are all performed inside the apparatus, which improves the security and reliability of the system and realizes an end-to-end security.

5. Economics of encryption smart apparatus. Since one embodiment of the present invention uses a smart card chip having a 32 or more bit microprocessor with USB interface, hardware cost is greatly reduced. The apparatus according to one embodiment of the present invention may be USB peripheral equipments, such as a smart card with a USB interface, an electronic key (USBKEY), a USB mouse, a USB keyboard, an artificial intelligence device (HID).

One or more embodiments of the present invention can be widely used in encrypted storage or moving protecting for information transmission in network and terminal hardware data, particularly in the application systems which have higher requirements for security, such as banks, securities, insurance, public security and national defense. It also can be applied in an encryption/decryption function of the next generation network technology Ipv6 to serve as encryption smart apparatus for Internet Protocol Security (IPSEC) which upgrades the conventional network Ipv4 to Ipv6. Because the conventional network Ipv4 protocol is considering how to realize interconnection in the internet, it ignores the security of data transmission in the network. Therefore, when people program the next generation internet protocol, IPSEC is introduced and it becomes necessary to have encryption/decryption protecting function in an Internet Protocol data packet. The encryption/decryption smart apparatus according to one embodiment of the present invention can provide a high speed symmetrical and asymmetrical encryption/decryption of mass data. This characteristic serves as an advantageous supplement to the IPSEC encryption/decryption function in the next generation network.

BRIEF DESCRIPTION OF THE DRAWINGS

One or more embodiments of the invention will be readily understood by the following detailed description in conjunction with the accompanying drawings, wherein like reference numerals designate like structural elements, and in which.

DETAILED DESCRIPTION

The present invention will be described in detail with reference to the figures and embodiments. The detailed description of various embodiments of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of embodiments of the present invention. However, the various embodiments of the present invention may be practiced without these specific details. In other instances, well known methods, procedures, components, and circuitry have not been described in detail to avoid unnecessarily obscuring aspects of the present invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
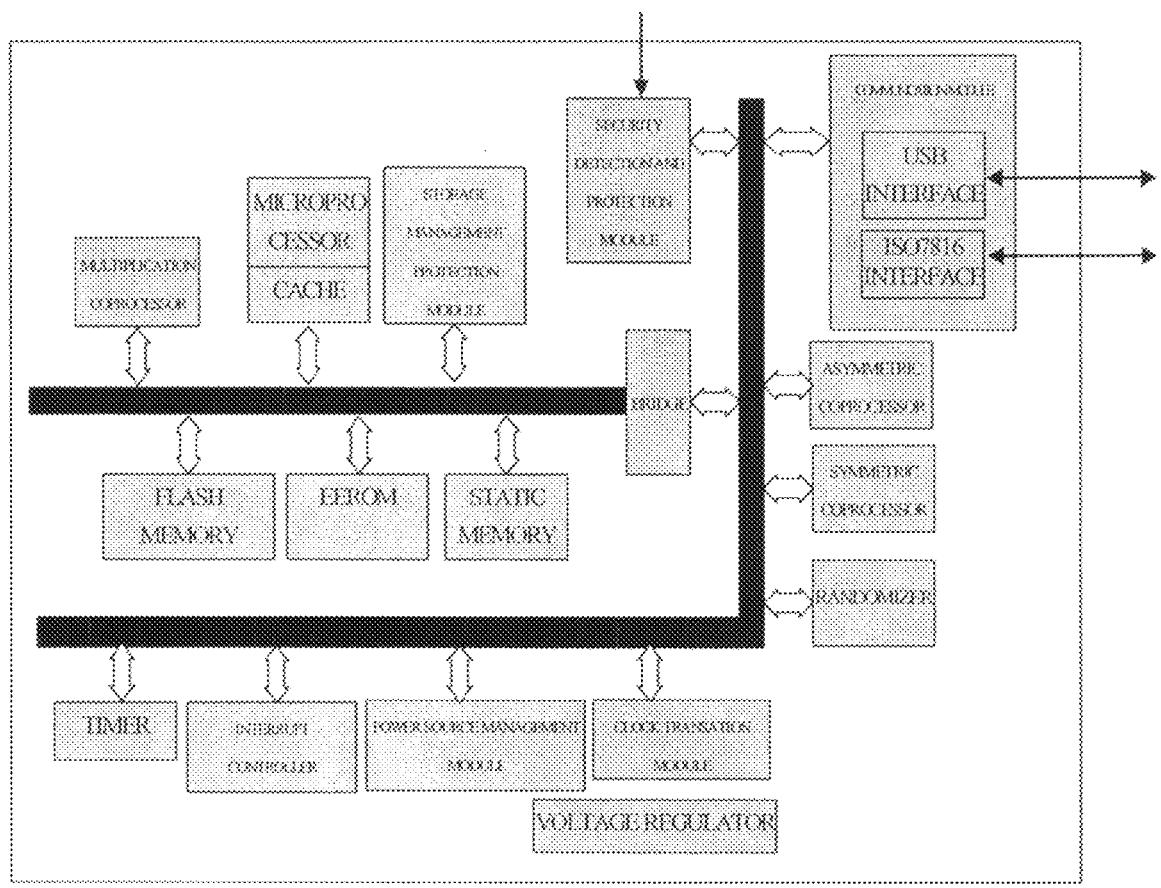
FIG. 1 shows the constituting modules of the encryption/decryption apparatus of one embodiment of the present invention.

FIG. 1 shows the constituting modules of the encryption/decryption apparatus of one embodiment of the present invention. The encryption/decryption apparatus comprises a microprocessor, a FLASH, an EEPROM, a SRAM block, a multiplication coprocessor module, a storage management protection module, a security detection and protection module, an asymmetric algorithm coprocessor, a symmetric algorithm coprocessor, a randomizer, a clock transaction module, a power source management module, an interrupt controller and a timer. The microprocessor, the FLASH, the EEPROM, the SRAM, the multiplication coprocessor module, the storage management protection module are connected with a data bus, and are connected via a bridge connector to the security detection and protection module, the asymmetric algorithm coprocessor, the symmetric algorithm coprocessor, the randomizer, the clock transaction module, the power source management module, the interrupt controller and the timer which are connected to the data bus. It also comprises external communication interface modules which are respectively connected to the microprocessor, the FLASH, the EEPROM, the SRAM, the multiplication coprocessor module, the storage management protection module, the security detection and protection module, the asymmetric algorithm coprocessor, the symmetric algorithm coprocessor via the data bus for data transmission between the encryption/decryption apparatus and external terminals. The external communication interface module comprises a Universal Serial Bus interface module and an ISO7816 interface module in one embodiment.

The chip used by the encryption/decryption apparatus of one embodiment is a high security SOC (system on a chip) chip based on a 32 or more bit Reduced Instruction Set Computing (RISC) processor and has characteristics of high processing capacity, high security, low power consumption and low cost. The chip of one embodiment has the following main characteristics:

1. Processor Performance.

The microprocessor is a tailor-made high security CPU core; it is a 32 or more bit RISC and adopts a five level stream line; its frequency is variable with the main frequency working at 100 MHz or above; and there is a multiplication coprocessor as hardware.

The microprocessor adopts a total security concept and has excellent security performance and processing capacity.

The microprocessor uses a high performance and high speed CACHE comprising an instruction CACHE of 1 K bytes and a data CACHE of 1 K bytes.

The storage management and protection unit (MMU) can be configured to be closed. After it is closed, a segment management mode can be supported and the maximum supported space is 128 MB. It has an application oriented storage partition, supports variable page length, uses a multi-level query structure, supports virtual storage space management, supports hardware security access control and the peripheral component access is controllable.

2. Storage Unit on a Chip.

The EEROM of one embodiment of the present invention is 32 KB and used as storage spaces of data and program; it can be used for reading, erasing and writing of a single byte and also for erasing and writing of single byte or multiple bytes (maximum of 64 bytes); it can tolerate at least 300,000 times of erasing and writing; data can be stored in it under room temperature for at least 10 years; the erasing and writing performance is as follows: a writing time for a single byte is 20 μs, a page erasing time is 4 ms, and a programming voltage of EEPROM is generated inside the chip.

The FLASH is 128 KB and is used as a storage space for programs, function library and device driving;

The minimum erasing and writing times for erasing and writing of 128 byte page is 20,000 times, data can be stored in it under room temperature for at least 10 years;

The erasing and writing performance is as follows: the writing time of a single byte is 20 μs, the page erasing time is 4 ms, and the SRAM is 8 KB.

3. Peripheral Components.

There are the following peripheral components according to various embodiments.

(1) Hardware error correction code (ECC) coprocessor.

(2) Hardware data encryption standard (DES) coprocessor. The data encryption standard (DES) coprocessor supports the encryption and decryption of a DES and a 3DES including 2KEY and 3KEY, and also supports the encryption and decryption in a way of Electronic Code Book (EBC) and Cipher Block Chaining (CBC). The data transmission channel is optimized to have a 3 Mbps bidirectional encryption/decryption speed for port data.

(3) High speed truly random number generator. The generator has a random number generation bit rate of 2 Mbps, which has passed the test of the Office of State Code Management Commission of China.

(4) USB interface. The USB interface supports full speed of USB1.1 protocol or higher speed. It supports three terminals, each of which supports dual buffers to have a high port utilization ratio. There is one serial interface which is in accordance with the ISO7816-3 standard, and supports a maximum clock of 5 MHz and a highest speed of 310 Kbps. There are one GIPO interface and two 32-bit timers. An oscillation controller and a Phase Locked Logic (PLL) are embedded, and a 4 MHz crystal can be connected externally. Power On Reset can be supported.

4. Security Characteristics

One embodiment has the following functions: hardware storage management and protection, high and low voltages detection, high and low frequencies detection, Differential Power Analysis/Static Power Analysis (DPA/SPA) attack protections, storage area encryption, bus scrambling, clock and reset signals pulse filtering and safe and optimized wiring. Each chip has a unique serial number.

5. Electrical Characteristics

The whole chip of one embodiment has a power consumption lower than 200 mw (at the voltage of 5V); there are three levels of lower power consumption mode control, that is, a maintain mode, a standby mode and a power fail mode. The power supply has an ISO mode of 2.7-5.5V and a USB mode of 3.6-5.5V. The anti static technical index (ESD) protection is above 4000V. Wiring bond positions of chip pins are in conformity with the provisions of the ISO7816-2.

Figure 2:
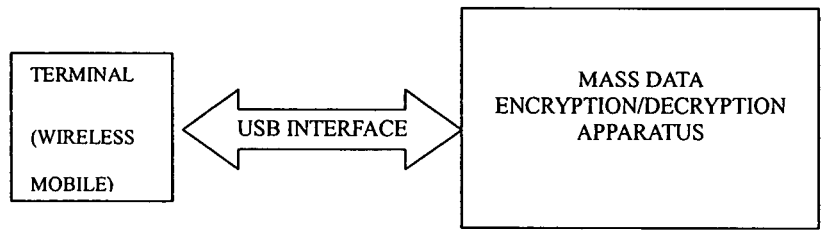
FIG. 2 is a schematic view showing the communication between the encryption/decryption apparatus of one embodiment of the present invention and a terminal.

FIG. 2 is a schematic view showing the communication between the encryption/decryption apparatus of one embodiment of the present invention and a terminal. The terminal can be a wire terminal, a wireless terminal, a handheld terminal and a mobile telephone. As shown in FIG. 2, the encryption/decryption apparatus performs a data information transmission between the mobile terminal via a USB interface in one embodiment.

Figure 3:
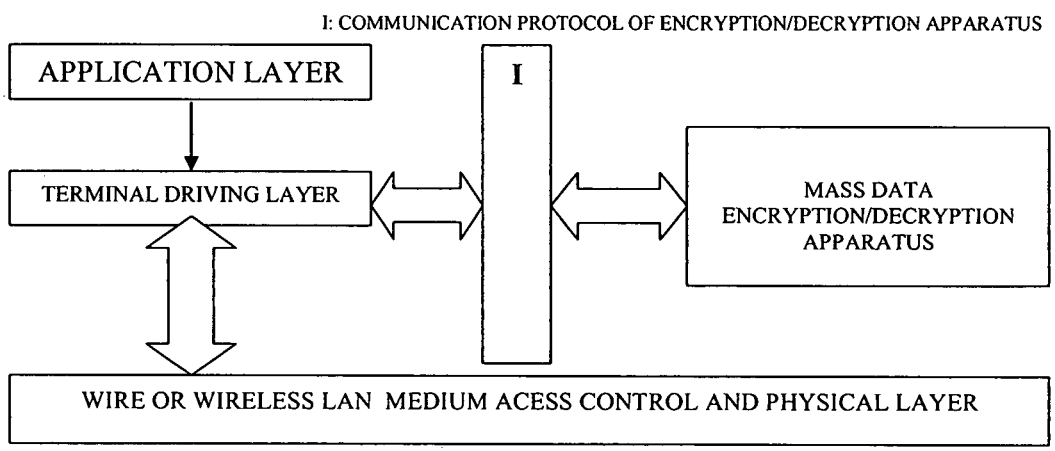
FIG. 3 is a schematic view showing the relationship between communication protocol of the encryption/decryption apparatus and other parts of the present invention according to an embodiment.

FIG. 3 is a schematic view showing the relationship between communication protocol of the encryption/decryption apparatus and other parts of an embodiment of the present invention. Since the encryption/decryption apparatus of one embodiment uses a USB interface to perform a communication, it is required to be supported by corresponding drivers, like the other USB apparatus, to ensure that the apparatus work properly on the terminal's operating system. Since the apparatus will process mass information data, a function of processing mass data is required to be added into the driver itself. According to one embodiment of the present invention, a special data communication protocol command packet is used when the USB interface performs communication. The command packet has a format of "NAD PCB STR LEN DATA BCC", in which NAD is card head selection command word, PCB is communication selection command word, STR is a stream control word, LEN is a data length word, DATA is a data field and BCC is a check word. The data is transferred after coded, which guarantees high-speed and complete data transmission and increases an encryption/decryption speed of mass data. The message code and functions of command packet of encryption/decryption data stream of the encryption/decryption apparatus are shown in the following Table 1.

TABLE 1

Message code and functions of command packet of encryption/decryption data stream of the encryption/decryption apparatus

| Code | Value | Meaning |
|---|---|---|
| NAD | 00/12/13H | Card selection NAD = 0x00/0x12 Main card head NAD = 0x13 SAM card head |
| PCB | 00H | Having no relation with communication; used when CPU card T = 1; PCB generally set as 0x00 if CPU is not specifically defined. |
| STR | 00H | When set as 00H, a smart card command format (APDU) mode is used to process commands; |
|  | 0XH | When set as 0XH, a stream information mode is used to process commands and corresponding passage is designated to perform stream encryption/decryption operations. In order to decrease command length of encryption/decryption data stream, lower three bits (b2, b1, b0) in the command word are used to denote a channel mark for stream encryption/decryption operations.<br><br>b7  b6  b5  b4  b3  b2  b1  b0<br>                0    1   X   X   X |
| LEN | XXXXH | Designating data length for performing encryption/decryption operations; length: 2 bytes. |
| DATA | data |  |
| BCC | XXH | XOR check byte |

Possibly echoed status code which is returned into mainframe data field of the encryption/decryption apparatus is shown in Table 2.

TABLE 2

Possibly echoed status code which is returned into mainframe data field

| SW1 SW2 | Meaning |
| --- | --- |
| 9000 | Command successfully executed |
| 6700 | Error length |
| 6A81 | Unsupportable function |
| 9401 | Error channel mark |

Figure 4:
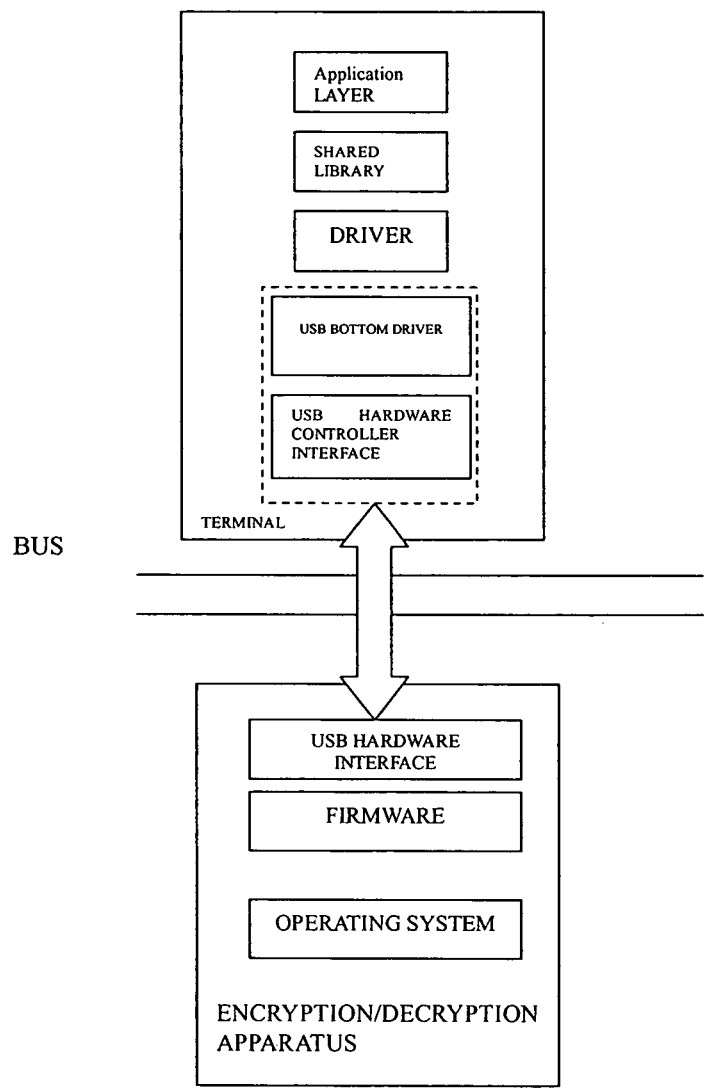
FIG. 4 is a flowchart of a communication data processing method of the encryption/decryption apparatus of one embodiment of the present invention.

FIG. 4 is a flowchart of a communication data processing method of the encryption/decryption apparatus in accordance with one embodiment of the present invention. A user calls a shared library corresponding to the encryption/decryption apparatus to write corresponding applications. Besides providing to users basic operating functions for the smart card, such as device communication, control and operations, the shared library also provides a function for processing encryption/decryption of mass data. As shown by combing the Tables 1 and 2, an embodiment of the present invention defines a stream control word (STR) which is necessary for transmission of the apparatus in the command packet of encryption/decryption data stream of the encryption/decryption apparatus. The function of the control word is to distinguish whether the user is using basic smart card commands which are in conformity with ISO 7815 provisions or stream encryption/decryption commands which are not in conformity with ISO 7815 provisions to operate the apparatus. In addition, the LEN command word is defined to be two bytes in order that the amount of bytes of data is increased and the encryption/decryption commands can be ensured to process data as much as possible.

Figure 5:
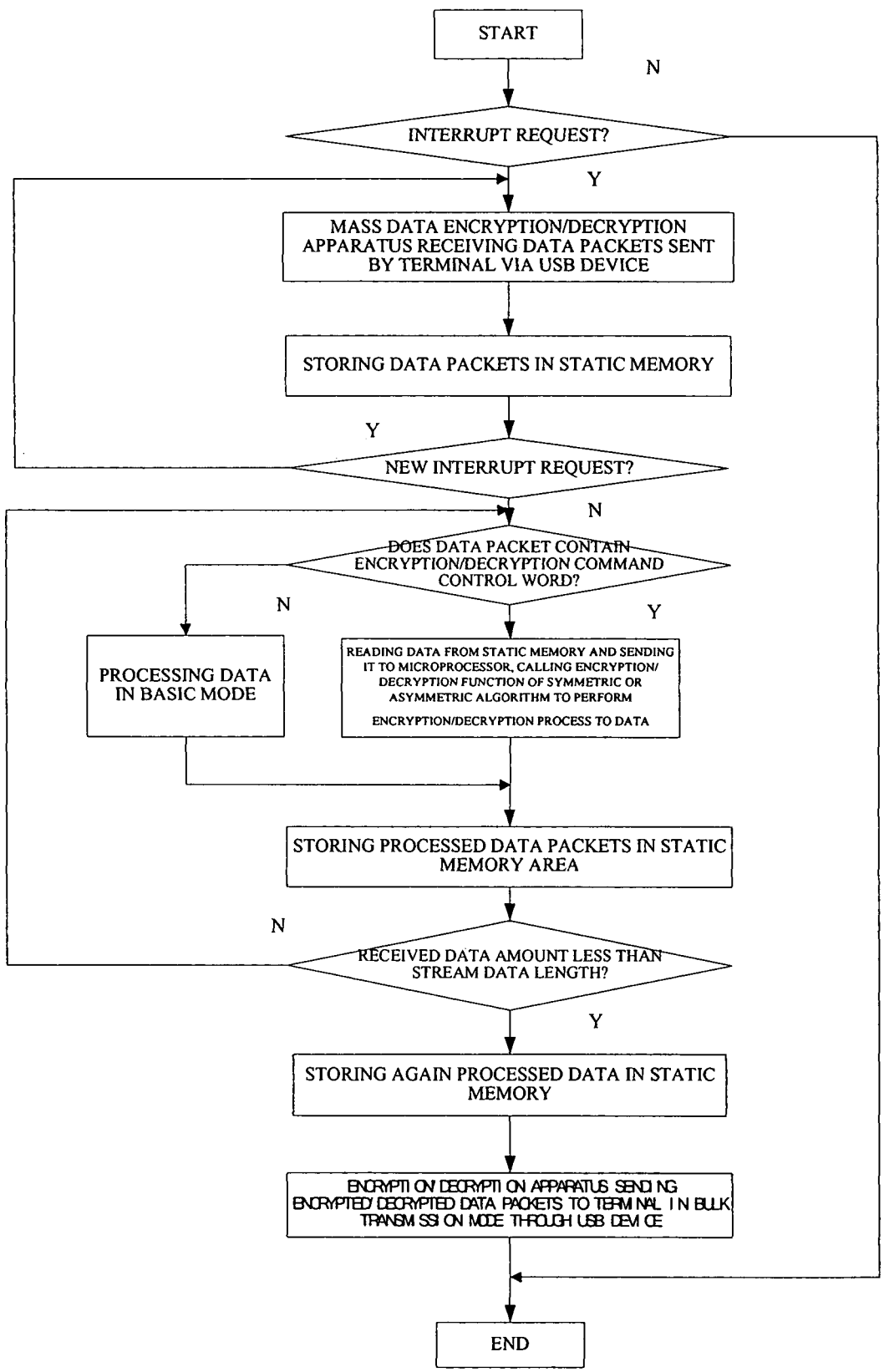
FIG. 5 is a main flow chart of one embodiment of the present invention.

FIG. 5 is a main flow chart of one embodiment of the present invention. As shown in FIG. 5, the terminal downloads data to be processed to a device driving layer via the shared library. The driving layer integrates data according to the communication protocol command and then transfers it to a USB bottom driver (USBD) self carried by the terminal and a USB hardware controller interface (UHCI/E) layer in the terminal. The UHCI/E is a standard USB device. Here, data is divided into a plurality of data packets of 64 bytes, and then the data packets are sent to the encryption/decryption apparatus according to their sequence. The encryption/decryption apparatus receives the data packets downloaded form the terminal in an interrupt mode. When the USB hardware interface USB IF at the apparatus end receives the first data packet, the program begins to process and determine whether this data packet contains encryption/decryption command control word. If yes, a mass data information process is performed. Otherwise, conventional basic processing mode is used to process the data. In the mass data processing, the program calls a symmetric algorithm or an asymmetric algorithm encryption/decryption function in the smart card operating system (COS) through a firmware in the encryption/decryption apparatus to process data information. At the same time, data of the terminal is received continuously with an interrupt mode to reduce the time needed for the transmission and increase the processing speed. Finally, data processed by the encryption/decryption smart terminal is uploaded in batch to the terminal.

The USB of an embodiment has the following four transmission modes:

1. Control transmission. The control transmission is a bidirectional transmission, usually with a small data amount. USB system program mainly serves to perform a query, a configuration and send general instructions to USB devices. The control transmission may comprise data of 8 bytes, 16 bytes, 32 bytes and 64 bytes depending on the USB devices and the transmission rate. The control transmission is typically used for the transmission between endpoints 0 between the mainframe and the USB peripheral equipments.

2. Isochronous transmission. The isochronous transmission provides a determined bandwidth and latency. It is used in the stream data transmission which is strict with time and has good error tolerance, or can be used in on-line applications which require constant data transmission rate. For example, the synchronous transmission mode will be a good choice for network telephone application performing on-line talk. Isochronous data require determined bandwidth value and determined maximum transmission times. For the isochronous transmission, an on-line data transmission is more important than an accurate data accuracy and data integrality.

3. Interrupt mode transmission. The interrupt mode transmission is mainly used for checking on schedule whether the apparatus has interrupt data to be transferred. The structure of the endpoint mode device determines that its checking frequency is in a range of 1 ms to 255 ms. The interrupt mode transmission is typically used in the transmission of a small quantity of data which is dispersed and unpredictable. Keyboards, joysticks and mice use this type of transmission. The interrupt mode transmission is a one way transmission and only has an input mode for the host. In this embodiment, data of 2-6K bytes can be transferred in one time.

4. Bulk transmission.

The bulk transmission is mainly used to ensure a transmission in a state that mass data is transferred and received and at the same time there is no special requirement on bandwidth and latency. Printers and scanners use this type of transmission. The bulk transmission is adapted for the transmission which is very slow and has a lot of delays. It also can transfer and receive data after transmission for the other types of data are finished.

One embodiment of the present invention selects a mode of combining the interrupt mode transmission and the bulk transmission in the USB transmission. That is, data is received in an interrupt mode and outputted in a bulk transmission mode. Such combination communication mode can improve the speed of encryption/decryption process for mass data of the encryption/decryption apparatus.

Figure 6:
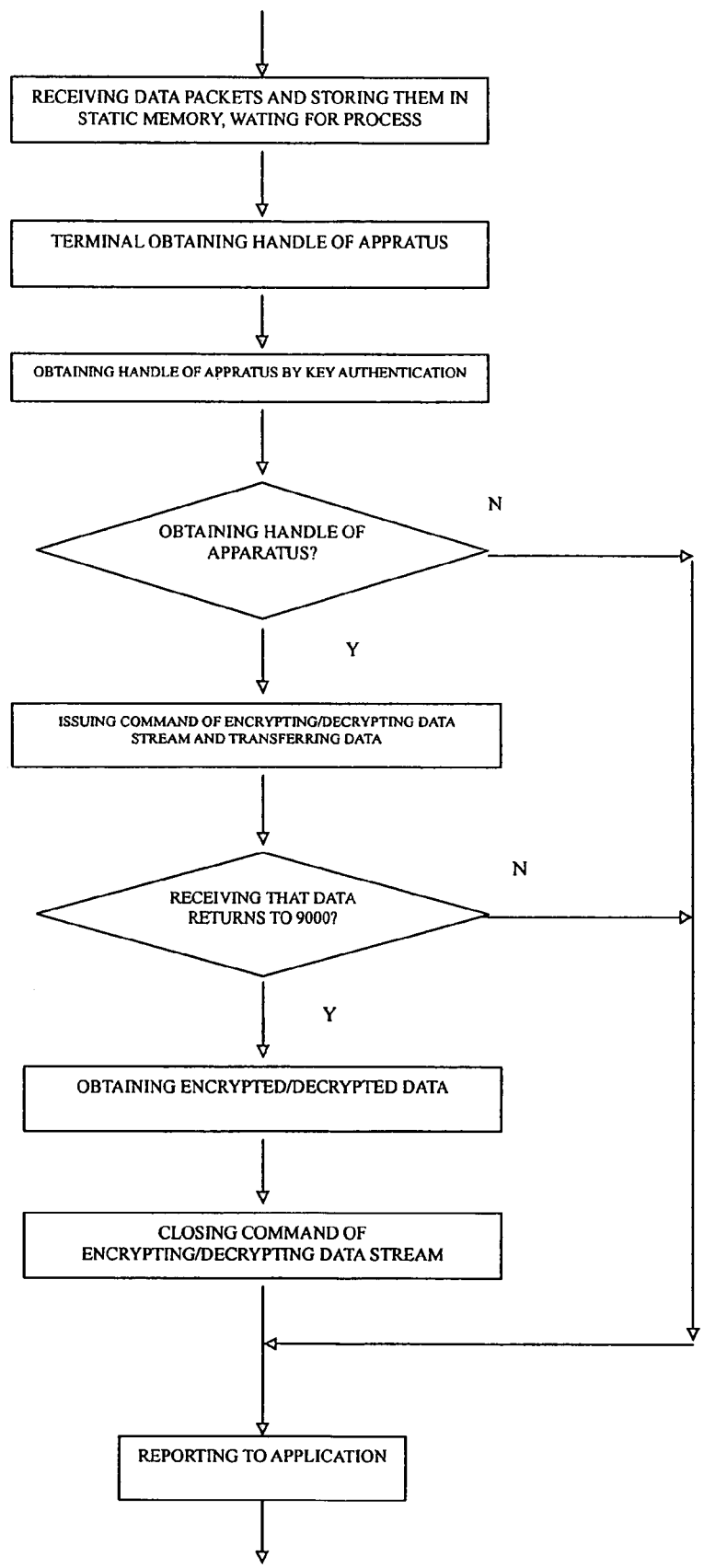
FIG. 6 is a flowchart showing the terminal using the encryption/decryption apparatus to perform an encryption/decryption to mass data according to one embodiment.
Figure 7:
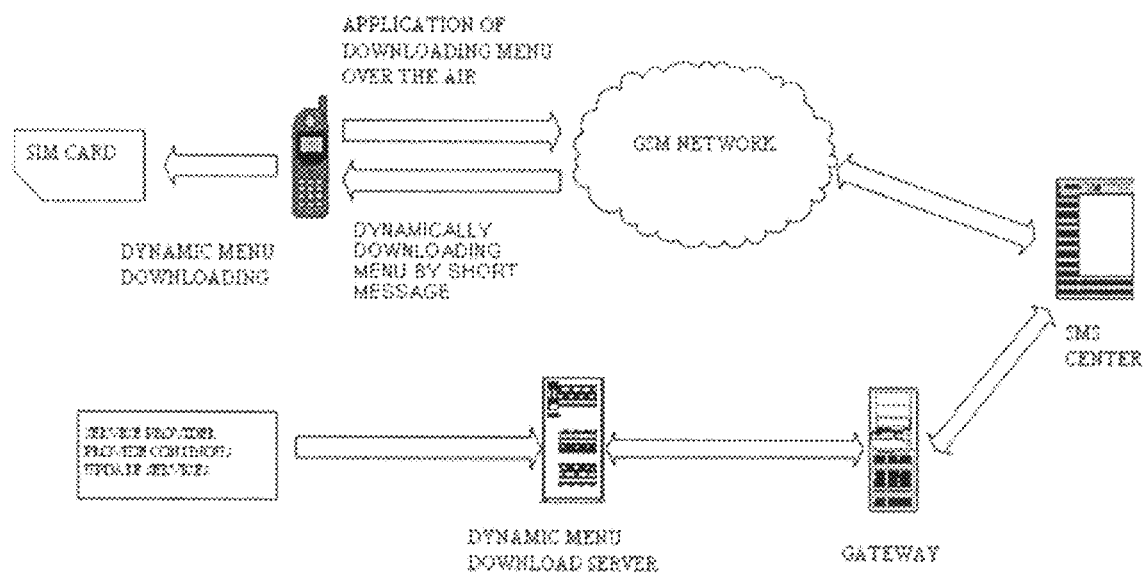
FIG. 7 is a schematic view showing the data encryption/decryption procedure of an encryption/decryption apparatus based on a mobile telephone according to one embodiment.

Please refer to FIGS. 6 and 7. FIG. 6 is a flowchart showing the terminal using the encryption/decryption apparatus to perform an encryption/decryption to mass data according to an embodiment. FIG. 7 is a schematic view showing the data encryption/decryption procedure of an encryption/decryption apparatus according to an embodiment based on a mobile telephone. In FIG. 7, a host computer receives from a mobile telephone data packets which are sent via the GSM network and stores them in a RAM area to be processed, and the mobile telephone terminal prepares stream data. The mobile telephone terminal obtains Handle of the apparatus. The mobile telephone terminal obtains Handle of the apparatus by key authentication. Whether the Handle is obtained is determined. If no, it reports to the application; if yes, a command for encrypting/decrypting data stream is issued. It further determines whether returning of the data to 9000 is received. If no, it reports to the application; if yes, it closes the command of encrypting/decrypting data stream and then reports to the application. With the development of wireless and communication technologies, mobile telephones have more and more powerful functions. The encryption/decryption apparatus can be provided to the users in a form of short message center (SIM) card to be used in the mobile telephone. Through the powerful data processing capacity of the encryption smart apparatus, voice information and short message information in the mobile telephone can be transferred in the wireless network in an encrypted mode, which can protect the personal information of users from stealing by attackers.

It should be noted that the embodiments above are only for the illustration of the present invention and not intended to limit the present invention. Therefore, though the present invention has been describe in detail with reference to the embodiments above, it should be understood by those skilled in the art, that any modification or equivalent replacement may be made to the present invention without departing from the spirit and scope of the present invention that are set forth in the appended claims.

The various embodiments described above can be combined to provide further embodiments. All of the foreign patents, foreign patent applications and non-patent publications referred to in this specification and/or listed in the Application Data Sheet are incorporated herein by reference, in their entirety. Aspects of the embodiments can be modified, if necessary, to employ techniques and structures of the various patents, applications and publications to provide yet further embodiments.

What is claimed is:

1. A separate type mass data encryption/decryption apparatus, comprising
   a microprocessor and a storage unit to store an encryption/decryption key; and
   an external communication interface module to connect to a peripheral data bus to transfer data packets between the encryption/decryption apparatus and an external terminal through a Universal Serial Bus protocol, and
   wherein said microprocessor is configured to determine whether a data packet sent by the external terminal contains an encryption/decryption command control word, process the data packet in a smart card command format APDU mode if the data packet does not contain the encryption/decryption command control word, and perform an encryption/decryption operation to the data packet by calling the encryption/decryption key if the data packet contains the encryption/decryption command control word and send the encrypted/decrypted data packet to the external terminal.

2. A separate type mass data encryption/decryption apparatus of claim 1, wherein the encryption/decryption apparatus receives data packets from the external terminal in an interrupt control mode and transfers data packets to the external terminal in a bulk transmission mode.

3. A separate type mass data encryption/decryption apparatus of claim 1, wherein the microprocessor is an at least 32-bit multilevel pipeline RISC processor and supports a secure access control of hardware and an access control of a peripheral component.

4. A separate type mass data encryption/decryption apparatus of claim 1, wherein the external communication interface module comprises at least a Universal Serial Bus interface module and an ISO7816 interface module.

5. An encryption/decryption implementing method of a separate type mass data encryption/decryption apparatus, the method comprising:
   the encryption/decryption apparatus receiving data packets which are sent by an external terminal through a Universal Serial Bus protocol;
   storing the data packets into a storage unit;
   a microprocessor determining whether a data packet sent by the external terminal contains an encryption/decryption command control word, processing the data packet in a smart card command format APDU mode if the data packet does not contain the encryption/decryption command control word, and performing an encryption/decryption operation to the data packet by calling an encryption/decryption key stored in the storage unit if the data packet contains the encryption/decryption command control word and storing the encrypted/decrypted data packet in the storage unit; and
   sending the encrypted/decrypted data packet to the external terminal in a bulk transmission mode through the Universal Serial Bus protocol.

6. An encryption/decryption implementing method of a separate type mass data encryption/decryption apparatus of claim 5, wherein the external terminal is a cable terminal, a wireless terminal or a handheld terminal.

7. An encryption/decryption implementing method of a separate type mass data encryption/decryption apparatus of claim 5, wherein a data communication protocol command applied between the encryption/decryption apparatus and the external terminal comprises a card head selection command word, a communication selection command word, a stream control word, a data length word and a data field.

8. An encryption/decryption implementing method of a separate type mass data encryption/decryption apparatus of claim 5, wherein at least one of the stored data packets has 64 bytes.

9. An encryption/decryption implementing method of a separate type mass data encryption/decryption apparatus of claim 5, wherein the encryption/decryption command control word has a 2-bytes length.

10. An encryption/decryption implementing method of a separate type mass data encryption/decryption apparatus of claim 5, wherein lower three bits of the encryption/decryption command control word serve as a channel mark for stream information encryption/decryption operation.

11. An encryption/decryption implementing method of a separate type mass data encryption/decryption apparatus of claim 5, wherein said performing the encryption/decryption operation also comprises encrypting/decrypting the key.

12. An encryption/decryption implementing method of a separate type mass data encryption/decryption apparatus of claim 5, wherein the encryption/decryption operation adopts a symmetric algorithm or an asymmetric algorithm.

13. An encryption/decryption implementing method of a separate type mass data encryption/decryption apparatus of claim 5, wherein in said sending the encrypted/decrypted data packets to the terminal in the bulk transmission mode, data is transferred by 2-6 KB in one time.

* * * * *